(No Model.) 2 Sheets—Sheet 1.

J. Q. C. SEARLE.
STEAM TRAP.

No. 495,377. Patented Apr. 11, 1893.

Witnesses.
Robert Garrett,
J. A. Rutherford.

Inventor.
John Q. C. Searle.
By James L. Norris.
Atty.

THE NORRIS PETERS CO., PHOTO-LITHO., WASHINGTON, D. C.

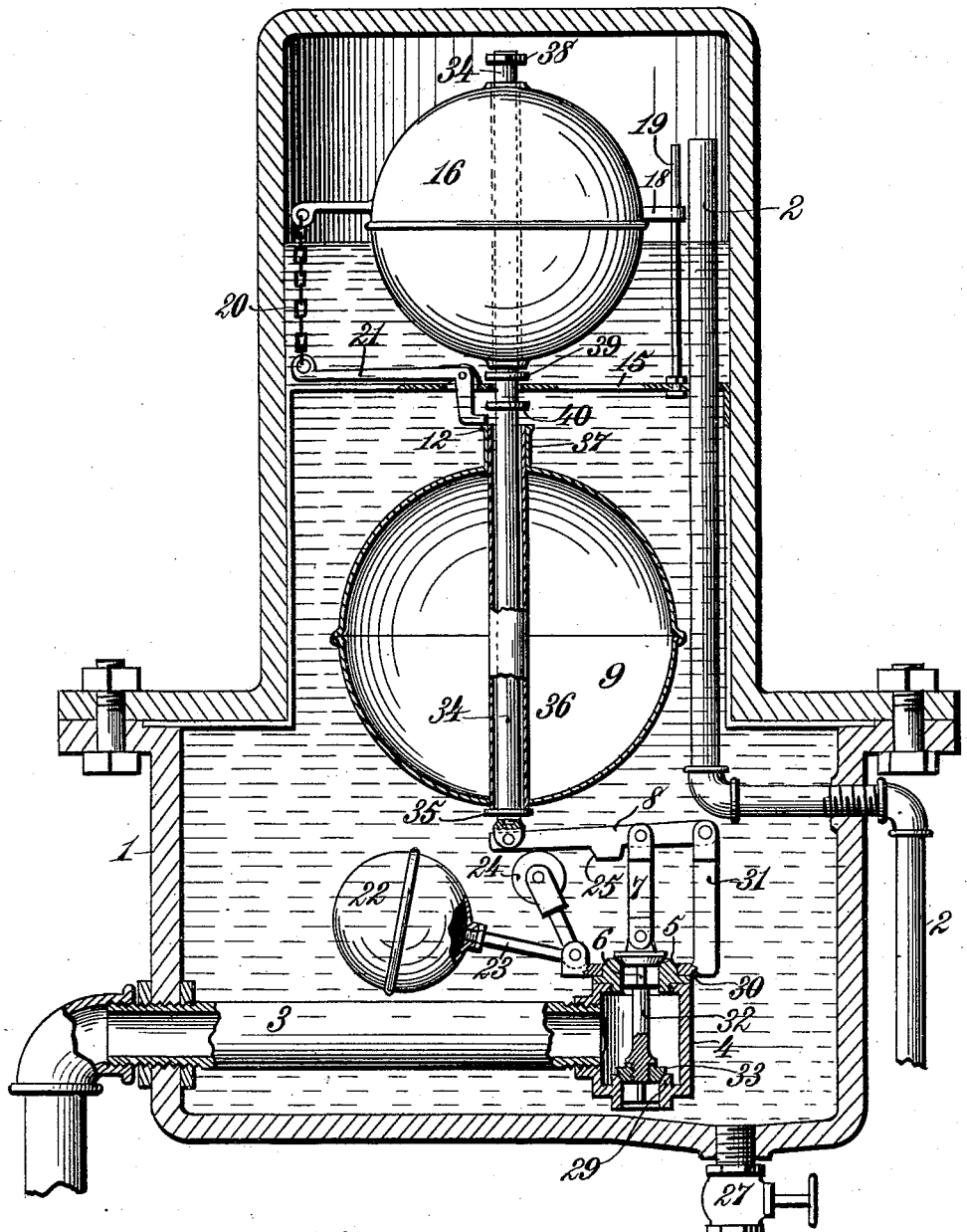

UNITED STATES PATENT OFFICE.

JOHN Q. C. SEARLE, OF CHICAGO, ILLINOIS.

STEAM-TRAP.

SPECIFICATION forming part of Letters Patent No. 495,377, dated April 11, 1893.

Application filed September 21, 1892. Serial No. 446,411. (No model.)

*To all whom it may concern:*

Be it known that I, JOHN Q. C. SEARLE, a citizen of the United States, residing at Chicago, in the county of Cook and State of Illinois, have invented new and useful Improvements in Steam-Traps, of which the following is a specification.

This invention relates to an automatic and periodically discharging trap adapted for use in connection with radiators for either a hot water or steam circulation, boiler feed attachments, heating coils, systems of railway car heating or in any situation where an automatic and periodical discharge of liquid is required.

The particular object of my invention is to provide a steam trap in which the condensed steam will be caused to gradually accumulate and effect its own discharge only at certain intervals so that all continuous dribbling of the water of condensation and consequent waste of steam will be avoided with the result of effecting a considerable economy of live steam.

The invention consists in certain features of construction and novel combinations of parts in an automatic and periodically discharging trap, comprising mechanism for automatically locking a valve and keeping it closed until the trap is ready to be discharged, mechanism for automatically opening the valve at intervals and mechanism for preventing the valve from closing until the trap is emptied, or the water of condensation nearly or quite discharged, as hereinafter more fully set forth.

Figure 1:
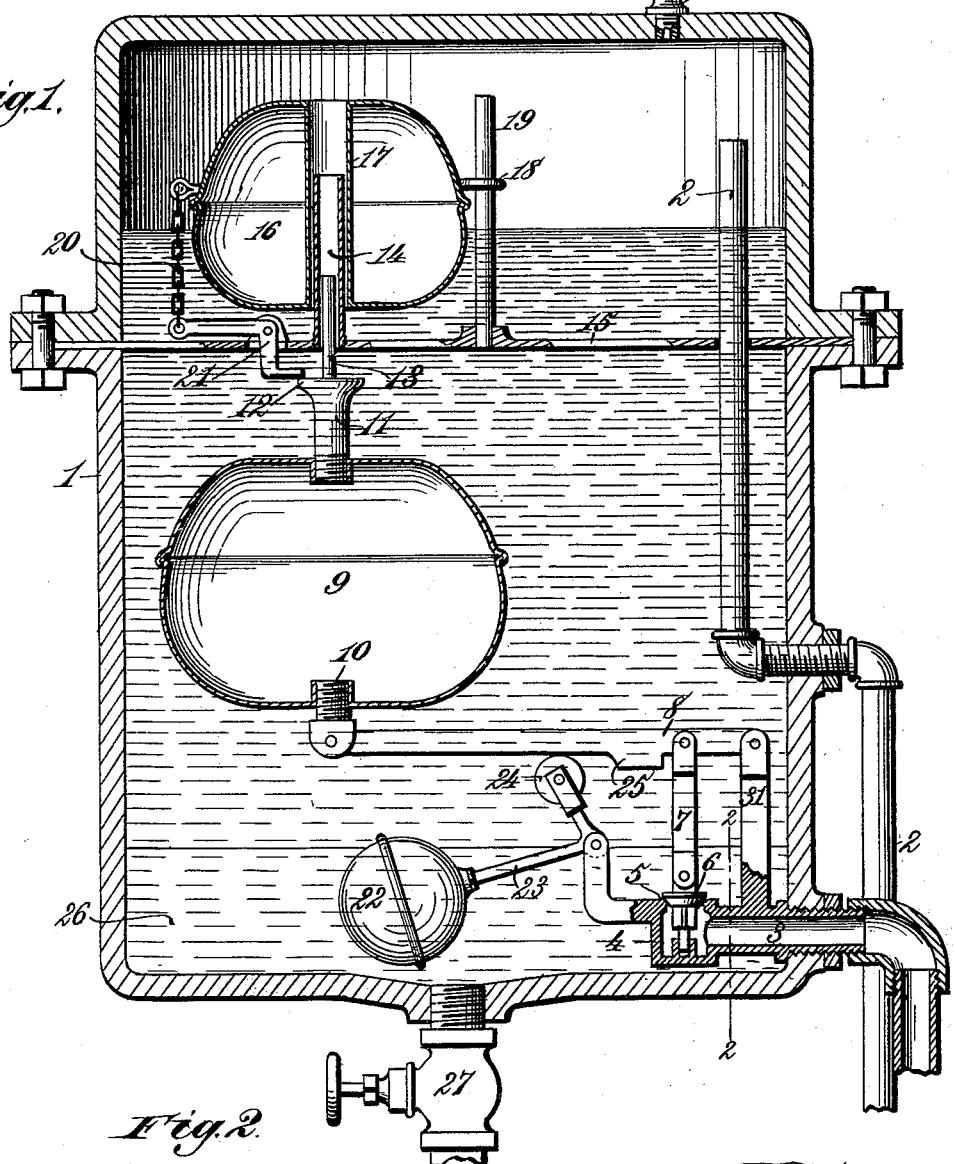
Figure 2:
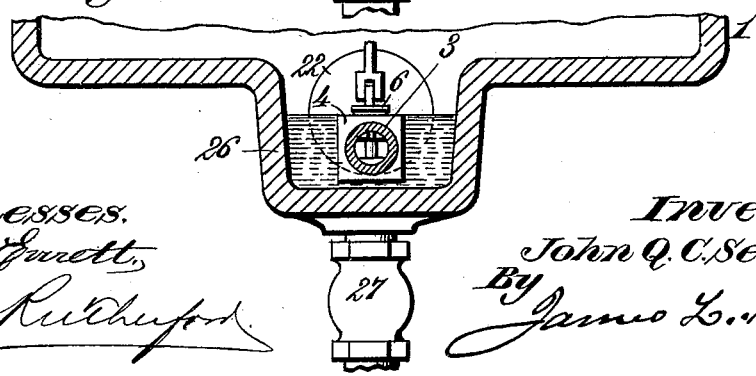

In the annexed drawings—Figure 1, is a sectional elevation of an automatic periodically discharging trap constructed according to my invention. Fig. 2, is a sectional detail view of the same on the line 2—2 of Fig. 1. Fig. 3, is a sectional elevation of the automatic and periodically discharging trap provided with a balanced valve.

Referring to the drawings the numeral 1, designates a trap casing which may be made in any suitable manner and provided with a steam inlet pipe or passage 2, located at any convenient or desirable point. In the lower part of the trap is an eduction pipe 3 through which the water of condensation is discharged periodically as hereinafter described.

On the inner end of the eduction pipe 3 and communicating therewith is a valve chamber 4 which as shown in Fig. 1 may be provided with a seat 5, for a valve 6 of suitable construction to control the exit of water through said valve chamber and eduction pipe. The valve 6 is connected by a link 7 to a valve lever 8 one end of which is fulcrumed to a suitable support within the trap casing.

To the outer end of the valve lever 8, Fig. 1, is connected a float 9 which is preferably mounted on a screw stud 10, pivotally attached to and projecting above said lever. The upper end of the float 9 is provided with a vertically projecting stem 11 having at or near its upper end a shoulder or flange 12 and terminating in a guide rod 13, that is loosely engaged in a guide tube 14 which projects above and is supported by a bar 15 that is extended horizontally across the interior of the trap casing at a suitable height. This bar 15 may be supported within the trap casing in any convenient manner. Above the transverse bar or support 15 and surrounding the guide tube 14, Fig. 1, is arranged an upper float 16 that may be somewhat smaller than the main float 9, as shown. The upper float 16 may be provided internally with a vertically arranged tubular guide 17 by which said float is adapted to have a vertically sliding movement on the stationary guide tube 14. In order to steady the vertical movements of the upper float 16 and prevent it from turning it may be provided on one side with a perforated guide lug or projection 18 engaging a vertical guide rod 19 supported by the transverse bar 15. To one side of the upper float 16 is attached one end of a link or chain 20 the lower end of which connects with a locking lever 21 by which the lower main float 9 and connected valve lever 8 are locked to keep the valve 6 closed until the trap is ready for discharging. The locking lever 21 is pivotally supported on the bar 15 and is provided with a short bent arm that is passed down through an opening in said bar so as to be in position for automatically engaging the shoulder 12 on the stem 11 of the main float. The long arm of this locking lever 21, by its greater weight, serves to hold the short arm of said lever in locking engagement with the shoulder 12 until automatically disengaged.

The mechanism by which an automatic disengagement of the shoulder 12 and locking lever is effected for the purpose of opening the valve of the trap, consists of the float 16 loosely mounted on the guide 14 and having a vertical movement thereon. It will be seen that when there is a sufficient accumulation of water in the trap to cause the float 16 to rise, the chain 20 or other flexible connection will raise the long arm of the lever 21 and thereby tilt its short arm so as to disengage it from the shoulder 12 and permit the buoyancy of the larger float 9 to raise the valve lever 8 and thereby open or unseat the valve 6 and automatically empty the trap.

In the lower part of the trap is a small float 22 attached to one arm of a bell-crank 23 that may be pivotally supported in any suitable manner. The other arm of the bell crank 23 may carry a friction wheel 24 arranged to engage the under side of the valve lever 8 and travel along the same as said lever is swung upward or downward on its fulcrum. When the accumulation of water in the trap is sufficient to raise the uppermost float 16 so as to unlock the main float 9 and cause it to unseat the valve 6 the upward swinging movement of the valve lever 8 enables the float 22 to oscillate the bell-crank 23 so as to move the friction wheel 24, or similar device, along the under side of the lever 8 toward its fulcrum until said wheel engages a stop 25 on the under side of said lever 8 which is thus locked or held in an elevated position so as to prevent closing of the valve until all or nearly all the water in the trap is discharged through the valve casing 4 and connected eduction pipe.

In the construction shown in Figs. 1 and 2 the bottom of the trap casing 1 may be provided with a transverse groove, pocket or recess 26 in which the valve casing 4 and float 22 are located as shown in Fig. 2 so that when the valve 6 is opened as above described no water will remain in the trap except the small quantity contained in said recess which will be insufficient to effect the operation of the trap or its valve mechanism.

It will be seen that the main float 9 becomes wholly submerged, during the filling of the trap, and remains so until the water rises to a sufficient height to move the upper float 16 and thereby automatically unlock or disengage the locking lever 21 from the locking projection or shoulder 12 and open the valve. By reason of the buoyancy of the main float 9 the valve 6 is suddenly opened to its full extent of movement as soon as the locking mechanism is unfastened or disengaged by the movement of the upper float 16, and though the water in the trap is thus suddenly discharged the movement of the friction wheel or locking device 24, actuated by the buoyancy of the connected float 22, is accomplished so quickly that the valve lever 8 will be held in an elevated position and prevented from falling and closing the valve until the water in the trap is nearly or quite discharged. When there is no longer sufficient water to sustain the float 22 the friction wheel or locking device 24 will move away from the fulcrum of the valve lever 8, and the falling of said lever will then close the valve. With the closing of the valve the descent of the float 9 will carry the shoulder 12 into locking engagement with the lever 21 to keep the valve closed until the trap is again ready for an automatic discharge.

In the bottom of the trap casing is arranged a hand valve 27 by which the trap can be drained when its further operation is not needed. When the service of the trap is again required the cock or valve 27 should be opened while steam is admitted to the trap through the inlet pipe or passage 2 for the purpose of driving out all the air. The valve or cock 27 will then be closed. In order, however, to relieve the trap of any contained air without opening said valve or cock 27, the trap casing may be provided with an automatically controlled air vent 28 if desired. As the water and condensing steam accumulate in the trap the float 22 will rise sufficiently to carry the friction wheel 24 into position for repeating its operation on the valve lever. The continued rise of water in the trap will not at first have any effect on the main float 9, because of the locking engagement of the shoulder 12 and lever 21, but when the height of the water is raised sufficiently to lift the uppermost float 16 the locking lever 21 will be automatically disengaged from the stem of the float 9 thereby releasing said float and permitting it to actuate the valve lever 8 so as to open the valve 6 as before described. The float 22 and connected friction wheel 24 now again act, in the manner already described, to prevent the valve from closing until the trap is discharged.

As shown in Fig. 3, the valve casing 4 may be open at both ends and provided with an upper valve seat 5 and a lower valve seat 29. The top of this valve casing 4 may support a ring 30 having a vertical arm or standard 31 projecting from one side. To the upper end of this standard 31 is fulcrumed one end of the valve lever 8 from which is suspended the link 7 that may have its upper end bifurcated and pivotally connected with said lever. The lower end of the link 7 may also be bifurcated and is pivotally connected with a lug on the outer face of the winged valve 6 that is adapted to fit the outer valve seat 5 at the upper end of the valve casing 4 and control one of the inlets to said valve casing and the connected eduction pipe of the trap. The upper valve 6 is connected by a stem 32 to a winged valve 33 adapted to engage the inner valve seat 29 and control the lower inlet to the interior of the valve casing. It will be seen that the arrangement of the valves 6 and 33 with relation to the valve seats 5 and 29 is such as to provide a balanced valve. By this construction a complete emptying of the trap is accomplished when the valves are opened in the manner hereinbefore described.

To the outer end of the valve lever 8 may be swiveled or pivotally connected a rod 34, Fig. 3, that is extended vertically through a guide opening in the bar 15 which is extended horizontally across the trap casing at a suitable height as hereinbefore described. At or near its lower end the rod 34 is provided with a shoulder or collar 35 to support the main float 9 which may be provided with an inner sleeve or tubular passageway 36 through which said rod is extended. The upper portion of the shell of the float 9 may be formed or provided with a tubular neck 37 having a shoulder 12 to engage the short arm of the locking lever 21 by which the float 9 and connected valve lever 8 are locked to keep the balanced valve closed until the trap is ready for discharging. The upper float 16 is connected with the locking lever 21 in the manner already described and may be loosely mounted on the upper portion of the rod 34 so as to have a slight vertical movement thereon between nuts or collars 38 and 39 that are attached to said rod. The lower or main float 9 may be also loosely mounted on the rod 34 so as to have a slight vertical movement thereon. Secured to the rod 34 above the neck of the main float 9 is an adjustable collar 40 against which the float neck 37 will abut when the float 9 rises. When there is a sufficient accumulation of water in the trap to cause the upper float 16 to rise the chain or connection 20 will raise the long arm of the lever 21 and thereby tilt its short arm so as to disengage it from the shoulder 12 and permit the main float 9 to rise in contact with the collar 40 and thereby carry upward the rod 34, valve lever 8 and link 7 through which movement the balanced valve will be unseated to automatically empty the trap.

It will be seen that by the automatic and periodical emptying of the steam trap, in which the condensed steam is caused to gradually accumulate and effect its own discharge only at certain intervals, all continuous dribbling of the water of condensation and consequent waste of steam are avoided with the result of effecting a considerable economy of the live steam.

A steam trap of this construction can be employed to advantage in connection with radiators for either a hot water or steam circulation, heating coils, boiler feed attachments, systems of railway car heating or in any situation where an automatic and periodically discharging steam trap is desirable.

What I claim as my invention is—

1. In an automatic and periodically discharging trap, the combination of a valve, a float connected with and adapted to open said valve periodically, an automatic locking mechanism to restrain the movement of said float and keep the valve closed until the trap is ready for automatic discharge, and an automatic locking mechanism adapted and arranged to hold the valve open until the trap is discharged and then permit the closing of the valve.

2. In an automatic and periodically discharging trap, the combination of a valve for controlling an eduction pipe, a float connected with and adapted to open said valve periodically, means for automatically locking and releasing said float whereby the valve is kept closed until the trap is ready for automatic discharge, and a locking mechanism for holding the valve open until the trap is discharged.

3. In an automatic and periodically discharging trap, the combination of a valve, a lever through which said valve is operated, a float connected with said lever in position to be normally submerged and adapted to operate said lever to open the valve periodically, an automatic locking mechanism adapted to restrain the movement of said float to keep the valve closed until the trap is ready for automatic discharge, and an automatic locking device adapted and arranged to act on the valve lever to prevent the valve from closing until the trap is discharged and then permit the closing of the valve.

4. In an automatic and periodically discharging trap, the combination of a valve for controlling an eduction pipe, a float connected with said valve in position to be normally submerged and adapted to open the valve periodically, means for automatically locking and releasing said float, whereby the valve is kept closed until the trap is ready for automatic discharge, a guide for said float, and an automatic locking mechanism adapted and arranged to hold the valve open until the trap is discharged and then permit the closing of the valve.

5. In an automatic and periodically discharging trap, the combination of a valve for controlling an eduction pipe, a float connected with and adapted to open said valve periodically, a locking mechanism adapted and arranged to engage said float and keep the valve closed until the trap is ready for automatic discharge, a float for automatically actuating said locking mechanism to open the valve, guides for said floats, and means for holding the valve open until the trap is discharged.

6. In an automatic and periodically discharging trap, the combination of a balanced valve for controlling an eduction pipe, a valve lever connected with said valve, a float connected with said lever for operating the same to open the valve, an automatic locking mechanism connected with the float and adapted to keep the valve closed until the trap is ready for a complete automatic discharge, and an automatic locking mechanism adapted and arranged to act on the valve lever to prevent the valve from closing until the trap is discharged and then release said lever and permit the closing of the valve.

7. In an automatic and periodically discharging trap, the combination of a balanced valve, a valve lever, a float connected with said lever in position to be normally submerged before the trap is discharged and adapted to raise said lever to open the valve periodically, an automatic locking lever connected with and actuated by said float to keep the valve closed until the trap is ready for a complete automatic discharge, and a float provided with an automatic locking mechanism adapted and arranged to act on the valve lever to prevent the valve from closing until the trap is discharged and then release said lever and permit the closing of the valve.

8. In an automatic and periodically discharging trap, the combination of a balanced valve for controlling an eduction pipe, a valve lever fulcrumed at one end and having a link connected with said valve, a rod pivotally connected with one end of said valve lever and carrying a float, an automatic locking mechanism connected with the float and adapted to keep the valve closed until the trap is ready for a complete automatic discharge, and a float provided with an automatic locking device adapted and arranged to act on the valve lever to prevent the valve from closing until the trap is discharged and then release said lever and permit the closing of the valve.

9. In an automatic and periodically discharging trap, the combination of a balanced valve for controlling an eduction pipe, a valve lever fulcrumed at one end and having a link connected with said valve, a rod pivotally connected with one end of said valve lever, one or more floats attached to said rod, an automatic locking lever connected with and actuated by one of said floats and adapted to keep the valve closed until the trap is ready to be discharged at one operation, and a two armed lever having a float on one arm and provided on its other arm with a locking device adapted to engage the under side of the valve lever and keep the valve open until the trap is discharged.

10. In an automatic and periodically discharging trap, the combination of a balanced valve for controlling an eduction pipe, a valve lever fulcrumed at one end and connected with said valve, a rod pivotally connected to one end of said valve lever, a float attached to the upper portion of said rod and adapted to open the valve, a float mounted on the lower portion of said rod in position to be normally submerged before the trap is discharged, an automatic locking lever connected with and actuated by the upper float and adapted to keep the valve closed until the trap is ready to be discharged at one operation, a two-armed lever, a float attached to one arm of said lever, and a friction wheel carried by the other arm of said lever and adapted to engage the under side of the valve lever to keep the same raised and prevent closing of the valve until the trap is discharged.

In testimony whereof I have hereunto set my hand and affixed my seal in presence of two subscribing witnesses.

JOHN Q. C. SEARLE. [L. S.]

Witnesses:
HOWARD M. NORRIS,
J. A. RUTHERFORD.